US010344798B2

(12) United States Patent
Clauss

(10) Patent No.: US 10,344,798 B2
(45) Date of Patent: Jul. 9, 2019

(54) COMPACT THRUST BEARING ASSEMBLIES, MECHANICAL ASSEMBLIES INCLUDING COMPACT THRUST BEARING ASSEMBLIES, AND METHODS OF PROVIDING LIMITED ROTATIONAL MOTION IN A COMPACT THRUST BEARING ASSEMBLY

(71) Applicant: The Boeing Company, Chicago, IL (US)

(72) Inventor: Martin J. Clauss, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 450 days.

(21) Appl. No.: 15/170,731

(22) Filed: Jun. 1, 2016

(65) Prior Publication Data

US 2017/0350445 A1 Dec. 7, 2017

(51) Int. Cl.

*F16C 17/04* (2006.01)
*B64C 27/48* (2006.01)

(Continued)

(52) U.S. Cl.

CPC .............. *F16C 17/04* (2013.01); *B64C 27/48* (2013.01); *B64C 27/51* (2013.01); *B64C 27/54* (2013.01); *F16C 17/26* (2013.01); *F16C 2326/43* (2013.01)

(58) Field of Classification Search

CPC .......... F16C 17/04; F16C 17/26; B64C 27/54; B64C 27/58; B64C 27/59; B64C 27/635

(Continued)

(56) References Cited

U.S. PATENT DOCUMENTS 1,952,574 A * 3/1934 Adams .................... D06F 49/06 210/237
3,424,893 A * 1/1969 Anderson .............. B21D 19/08 219/149

(Continued)

FOREIGN PATENT DOCUMENTS

GB 1351935 5/1974
WO WO 2013/128535 9/2013

OTHER PUBLICATIONS

Machine-generated English translation of the abstract of WO 2013/128535, downloaded from Espacenet.com on Dec. 11, 2017.

(Continued)

*Primary Examiner* — Jason D Shanske
*Assistant Examiner* — Brian O Peters
(74) *Attorney, Agent, or Firm* — D'Ascenzo Intellectual Property Law, P.C.

(57) ABSTRACT

Compact thrust bearing assemblies, mechanical assemblies including the compact thrust bearing assemblies, and methods of providing limited rotational motion in a compact thrust bearing assembly are disclosed herein. The thrust bearing assemblies include a plurality of rigid load-bearing structures arranged in a layered stack that defines a first end and an opposed second end. The thrust bearing assemblies further include a plurality of rotation-limiting structures configured to restrict relative rotation between adjacent pairs of rigid load-bearing structures. The thrust bearing assemblies also include a first load-receiving surface configured to receive a first thrust load and a second load-receiving surface configured to receive a second thrust load. The methods include methods of providing limited rotational motion in a thrust bearing assembly.

20 Claims, 8 Drawing Sheets

(51) Int. Cl.
*B64C 27/51* (2006.01)
*B64C 27/54* (2006.01)
*F16C 17/26* (2006.01)

(58) Field of Classification Search
USPC .................................................. 384/424–426
See application file for complete search history.

(56) References Cited

U.S. PATENT DOCUMENTS

| | | | | |
|---|---|---|---|---|
| 3,722,210 | A * | 3/1973 | Kuhn | F02N 9/04 123/179.31 |
| 3,786,378 | A | 1/1974 | Ligouri | |
| 3,941,433 | A | 3/1976 | Dolling et al. | |
| 4,040,690 | A | 8/1977 | Finney | |
| 4,142,833 | A * | 3/1979 | Rybicki | B64C 27/35 384/221 |
| 4,227,858 | A | 10/1980 | Donguy | |
| 6,404,298 | B1 * | 6/2002 | Rohr | H01P 1/025 333/208 |
| 2005/0147335 | A1 | 7/2005 | Agrawal | |

OTHER PUBLICATIONS

European Patent Office, Extended European Search Report for related European Application No. 17162255, dated Oct. 12, 2017.

* cited by examiner

Fig. 15

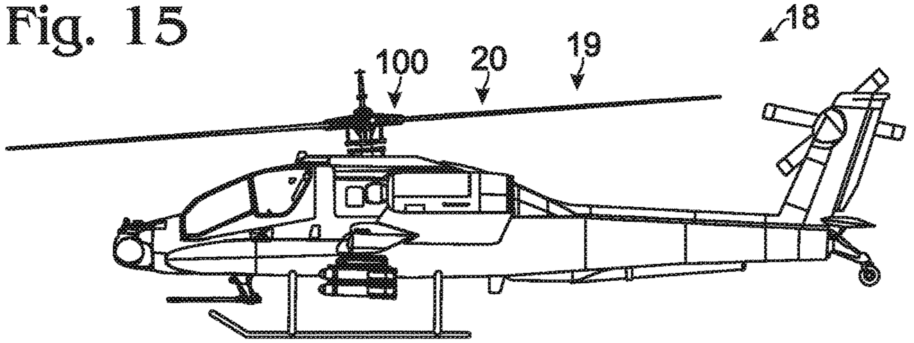

310 APPLY FIRST THRUST LOAD
↓
320 APPLY SECOND THRUST LOAD
↓
330 APPLY TORSIONAL FORCE
↓
340 ROTATE TO FIRST ANGLE OF ROTATION
↓
350 RESIST ROTATION PAST FIRST ANGLE OF ROTATION
↓
360 RESIST WEAR BETWEEN FIRST AND SECOND RIGID LOAD-BEARING STRUCTURES
↓
370 ROTATE TO SECOND ANGLE OF ROTATION
↓
380 RESIST ROTATION PAST SECOND ANGLE OF ROTATION
↓
390 RESIST WEAR BETWEEN SECOND AND THIRD RIGID LOAD-BEARING STRUCTURES

COMPACT THRUST BEARING ASSEMBLIES, MECHANICAL ASSEMBLIES INCLUDING COMPACT THRUST BEARING ASSEMBLIES, AND METHODS OF PROVIDING LIMITED ROTATIONAL MOTION IN A COMPACT THRUST BEARING ASSEMBLY

FIELD

The present disclosure relates generally to compact thrust bearing assemblies, to mechanical assemblies including the compact thrust bearing assemblies, and to methods of providing limited rotational motion in a compact thrust bearing assembly.

BACKGROUND

Thrust bearing assemblies may be utilized to support thrust loads and/or to permit rotational motion of a first body relative to a second body. Such thrust bearing assemblies may be formed and/or defined in a variety of ways. As an example, helicopter rotors include a rotor hub and a plurality of blades, and it may be desirable to rotate, or feather, the blades relative to the rotor hub. This relative rotation generally is facilitated by a resilient bearing, or bushing. The rubber bushing supports the thrust loads generated by rotation of the helicopter rotor. In addition, the rubber bushing deforms and/or twists to permit rotation of the blades relative to the rotor hub. While such a rubber bushing may be suitable for some rotor hubs, it may exhibit a limited service life, or require significant bearing length to keep elastomer torsional strain within design limits. Thus, there exists a need for improved compact thrust bearing assemblies, for mechanical assemblies including the improved compact thrust bearing assemblies, and/or for methods of providing improved rotational motion in a compact thrust bearing assembly.

SUMMARY

Compact thrust bearing assemblies, mechanical assemblies including the thrust bearing assemblies, and methods of providing limited rotational motion in a thrust bearing assembly are disclosed herein. The thrust bearing assemblies include a plurality of rigid load-bearing structures arranged in a layered stack that defines a first end and an opposed second end. The thrust bearing assemblies further include a plurality of rotation-limiting structures configured to restrict relative rotation between adjacent pairs of rigid load-bearing structures to at most a threshold adjacent pair angle of rotation. The plurality of rotation-limiting structures also are configured to restrict overall relative rotation between the first end of the layered stack and the second end of the layered stack to at most a threshold stack angle of rotation. The threshold stack angle of rotation is greater than the threshold adjacent pair angle of rotation. The thrust bearing assemblies also include a first load-receiving surface configured to receive a first thrust load from a first body and a second load-receiving surface configured to receive a second thrust load from a second body.

The methods include methods of providing limited rotational motion in a thrust bearing assembly. The methods include applying a first thrust load, with a first body, to a first load-receiving surface on a first end of the thrust bearing assembly. The methods also include applying a second thrust load, with a second body, to a second load-receiving surface on a second end of the thrust bearing assembly. The methods further include applying a torsional force between the first body and the second body. The methods also include rotating the first body and the second body relative to one another, and to a first angle of rotation, via relative rotation between a first rigid load-bearing structure of the thrust bearing assembly and a second rigid load-bearing structure of the thrust bearing assembly. The methods further include rotating the first body and the second body relative to one another, and to a second angle of rotation, via relative rotation between the second rigid load-bearing structure and a third rigid load-bearing structure of the thrust bearing assembly.

BRIEF DESCRIPTION OF THE DRAWINGS

FIG. 15 is a schematic side view of a helicopter including the rotor assembly of FIG. 14.

FIG. 16 is a flowchart depicting methods, according to the present disclosure, of providing limited rotational motion in a thrust bearing assembly.

DESCRIPTION

Figure 1:
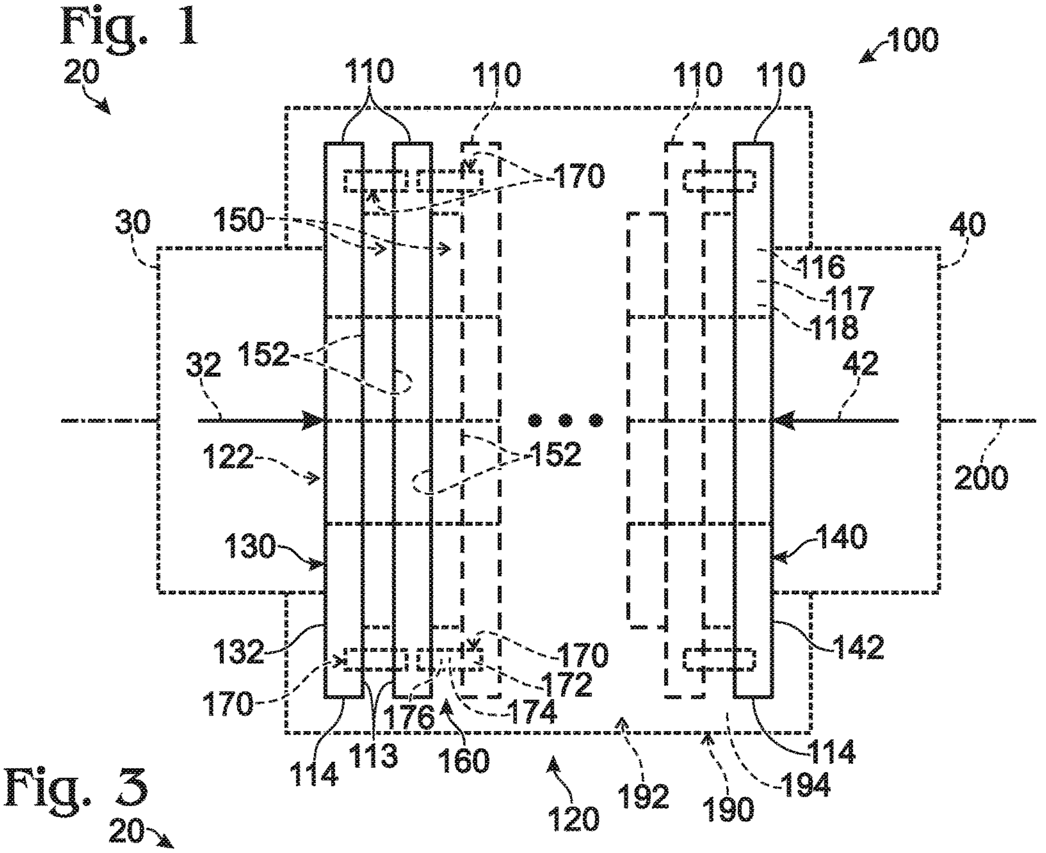
FIG. 1 is a schematic representation of examples of a thrust bearing assembly according to the present disclosure.

FIGS. 1-16 provide examples of compact thrust bearing assemblies 100, mechanical assemblies 20 that include thrust bearing assemblies 100, and/or methods 300, according to the present disclosure. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic representation of examples of a compact thrust bearing assembly 100 according to the present disclosure. Compact thrust bearing assembly 100 also may be referred to herein as a thrust bearing assembly 100. Thrust bearing assembly 100 may be included in and/or may form a portion of a mechanical assembly 20. Mechanical assembly 20 also includes a first body 30 and a second body 40. First body 30 may apply a first thrust load 32 to thrust bearing assembly 100 and second body 40 may provide a second thrust load 42 to thrust bearing assembly 100. Thrust bearing assembly 100, which also may be referred to herein as an assembly 100, may be configured to support first thrust load 32 and second thrust load 42. In addition, thrust bearing assembly 100 may be configured to permit and/or facilitate limited, controlled, and/or restricted relative rotation between first body 30 and second body 40 about a rotational axis 200, as discussed in more detail herein. First thrust load 32 and/or second thrust load 42 may be applied to thrust bearing assembly 100 in any suitable manner. As examples, first thrust load 32 and/or second thrust load 42 may be a centripetal force, a centrifugal force, a gravitational force, and/or a reaction force.

As illustrated in solid lines in FIG. 1, thrust bearing assembly 100 includes a plurality of rigid load-bearing structures 110. Rigid load-bearing structures 110 are arranged in layered stack 120, and layered stack 120 includes a first end 130 and a second end 140. Second end 140 is opposed to, or faces away from, first end 130. First end 130 includes a first load-receiving surface 132, and first load-receiving surface 132 is configured to receive first thrust load 32 from first body 30. Similarly, second end 140 includes a second load-receiving surface 142, and second load-receiving surface 142 is configured to receive second thrust load 42 from second body 40. As illustrated, first thrust load 32 may be directed toward first load-receiving surface 132. Similarly, second thrust load 42 may be directed toward second load-receiving surface 142. As such, thrust bearing assembly 100 may be referred to herein as being placed in compression via application of first load 32 and second load 42 and/or as being compressed between at least a portion of first body 30 and at least a portion of second body 40.

As also illustrated in dashed lines in FIG. 1, thrust bearing assembly 100 further includes a plurality of rotation-limiting structures 170. Rotation-limiting structures 170 may be configured to restrict relative rotation of, or between, each adjacent pair of rigid load-bearing structures 110 and about rotational axis 200 to at most a threshold adjacent pair angle of rotation; and at least one rotation-limiting structure 170 may be associated with, may extend between, and/or may be configured to operatively engage with, each adjacent pair of rigid load-bearing structures 110. In addition, the plurality of rotation-limiting structures 170 together, or collectively, may be configured to resist relative overall rotation of first end 130 relative to second end 140 to at most a threshold stack angle of rotation. The threshold stack angle of rotation is greater than the threshold adjacent pair angle of rotation, as discussed in more detail herein with reference to FIGS. 7-12.

During operation of thrust bearing assembly 100 and/or of mechanical assembly 20 that includes thrust bearing assembly 100, first body 30 and second body 40 may rotate relative to one another. During this rotation, rotation-limiting structures 170 permit each adjacent pair of rigid load-bearing structures 110 to rotate, relative to one another, by at most the threshold adjacent pair angle of rotation. As such, a relative motion, a distance of motion, and/or a relative velocity at an interface region 160 between the adjacent pairs of rigid load-bearing structures is restricted. However, and due to the fact that thrust bearing assembly 100 generally includes three or more rigid load-bearing structures, the overall relative rotation between first body 30 and second body 40 may be, or is permitted to be, greater than the threshold adjacent pair angle of rotation and/or may be, or is permitted to be, as large as the threshold stack angle of rotation. The threshold stack angle of rotation generally is, is a result of, or is a sum of, the individual adjacent pair angle of rotation between each adjacent pair of rigid load-bearing structures 110.

As illustrated in dashed lines in FIG. 1, thrust bearing assemblies 100 also may include a plurality of interface structures 150. Interface structures 150, when present, extend within interface region 160 and/or between corresponding adjacent pairs of rigid load-bearing structures 110. Interface structures 150 are configured to provide a low-friction and/or wear-resistant interface between the corresponding adjacent pairs of rigid load-bearing structures 110 during relative rotation therebetween and about rotational axis 200. The low friction and/or wear resistance of interface structures 150 also may reduce heat generation and/or buildup between the corresponding adjacent pairs of rigid load-bearing structures, further extending the life of thrust bearing assemblies 100 that are disclosed herein.

As an example, interface structures 150 may be adapted, configured, selected, and/or formulated to provide a low static friction interface between the corresponding adjacent pairs of rigid load-bearing structures 110 during the relative rotation therebetween. As another example, interface structures 150 may be adapted, configured, selected, and/or formulated to provide a low kinetic friction interface between the corresponding adjacent pairs of rigid load-bearing structures 110 during the relative rotation therebetween.

As illustrated in FIG. 1, interface structures 150, when present, may be configured to maintain the corresponding adjacent pairs of rigid load-bearing structures 110 in a spaced-apart relationship. Stated another way, each interface structure 150 may extend between, or separate, the corresponding adjacent pair of rigid load-bearing structures 110. As an example, the corresponding adjacent pair of rigid load-bearing structures may include a pair of load-bearing interface surfaces 113, and each interface structure 150 may be adapted, configured, designed, and/or constructed to maintain the pair of load-bearing interface surfaces 113 in a spaced-apart relationship, prevent direct physical contact between the pair of load-bearing interface surfaces 113, and/or lower a frictional force that resists rotation between the pair of load-bearing interface surfaces 113 during relative rotation of the pair of load-bearing interface surfaces 113 about rotational axis 200.

It is within the scope of the present disclosure that interface structures 150, when present, may be positioned and/or retained within interface regions 160 in any suitable manner. As an example, a given interface structure 150 may be operatively attached to one of the corresponding pair of adjacent rigid load-bearing structures 110 and may include an interface structure surface 152 that directly and/or operatively contacts the other of the corresponding adjacent pair of rigid load-bearing structures 110.

As another example, a pair of interface structures 150 may be operatively attached to a first rigid load-bearing structure and may define a pair of interface structure surfaces 152 that face away from one another. Each interface structure surface 152 may directly and/or operatively contact a corresponding adjacent rigid load-bearing structure 110. Under these conditions, interface structure surfaces 152 also may be referred to herein as low-friction surfaces and/or as low-wear surfaces.

It is within the scope of the present disclosure that thrust bearing assembly 100 may include any suitable number of interface structures 150. As an example, a number of interface structures 150 in thrust bearing assembly 100 may correspond to a number of rigid load-bearing structures 110 in thrust bearing assembly 100. As another example the number of interface structures 150 may be one less than the number of rigid load-bearing structures 110. Examples of the number of rigid load-bearing structures 110 are disclosed herein.

It is within the scope of the present disclosure that interface structures 150, when present, may include, be, be formed from, comprise, consist of, and/or consist essentially of any suitable material and/or materials. As examples, interface structures 150 may include one or more of a low-friction material and a low-friction fabric. As more specific examples, interface structures 150 may include one or more of a polymer, a fluoropolymer, a fluorocarbon, and a tetrafluoroethylene.

As another more specific example, interface structures 150 may include a thin sheet of fluoropolymer fabric. Under these conditions, the thin sheet of fluoropolymer fabric may have a thickness of at least 100 micrometers, at least 150 micrometers, at least 200 micrometers, and/or at least 250 micrometers. Additionally or alternatively, the thickness may be at most 500 micrometers, at most 450 micrometers, at most 400 micrometers, at most 350 micrometers, and/or at most 300 micrometers.

As yet another example, interface structures 150 may include a material that is configured and/or selected to withstand a high contact pressure, such as a material with a high Young's Modulus. As another example, interface structures 150 may include a material that is configured and/or selected to be wear-resistant when subjected to sliding friction.

It is within the scope of the present disclosure that each interface structure 150 within thrust bearing assemblies 100 may be similar, at least substantially similar, or even functionally identical to each other interface structure 150. Alternatively, it is also within the scope of the present disclosure that at least one frictional characteristic of at least one interface structure 150 purposefully may be different from the at least one frictional characteristic of at least one other interface structure 150. Such a configuration may be utilized to selectively determine which adjacent pair of rigid load-bearing structures 110 initiates relative motion about rotational axis 200 first. As an example, the at least one frictional characteristic may be selected such that the corresponding pair of rigid load-bearing structures 110 that is associated with one of the plurality of interface structures 150 initiates the relative motion prior to the corresponding pair of rigid load-bearing structures 110 that is associated with another interface structure initiating the relative motion.

In the above discussion, interface structures 150 may be utilized to provide a low-friction and/or a low-wear interface between corresponding adjacent pairs of rigid load-bearing structures 110. However, thrust bearing assemblies 100, according to the present disclosure, are not necessarily required to include and/or utilize interface structures 150. As an example, and for some applications, an amount of friction and/or wear that results from direct contact between rigid load-bearing structures 110 may be sufficiently low without the inclusion of interface structures 150 within thrust bearing assemblies 100. As another example, one or more material properties of rigid load-bearing structures 110 may be similar, or even identical to those described herein for interface structures 150. As yet another example, and as discussed in more detail herein, a fluid and/or lubricant may be utilized to decrease friction and/or wear between adjacent pairs of rigid load-bearing structures 110.

Rotation-limiting structures 170 may include any suitable structure that may be adapted, configured, designed, constructed, and/or shaped to restrict relative rotation between corresponding adjacent pairs of rigid load-bearing structures 110 about rotational axis 200. In addition, rotation-limiting structures 170 also may be configured to resist relative motion among the plurality of rigid load-bearing structures in a, or in any, direction that is perpendicular, or at least substantially perpendicular, to rotational axis 200.

As an example, a subset, or even each, of the rigid load-bearing structures 110 may include a projecting region 172 that extends from the rigid load-bearing structure. In addition, a subset, or each, rigid load-bearing structure 110 also may include at least one recessed region 174 that is defined by the rigid load-bearing structure. Under these conditions, and in each adjacent pair of rigid load-bearing structures, a given projecting region 172 may be received within a corresponding recessed region 174 to define a corresponding rotation-limiting structure 170. In addition, the corresponding recessed region 174 may be sized to permit limited motion of the given projecting region 172 therewithin. Such a configuration is illustrated in more detail in FIGS. 2-4 and 7-12 and discussed herein with reference thereto.

Each rigid load-bearing structure 110 may include, or be, a monolithic structure that defines both a respective projecting region 172 and a respective recessed region 174. However, this is not required.

It is within the scope of the present disclosure that each rigid load-bearing structure may include and/or define any suitable number of projecting regions 172 and/or recessed regions 174. As examples, a given rigid load-bearing structure may include and/or define 0, at least 1, at least 2, at least 3, or at least 4 projecting regions 172 and/or recessed regions 174.

As illustrated in FIGS. 2-4 and 7-12, projecting regions 172, when present, may extend in a direction that is parallel, or at least substantially parallel, to rotational axis 200. In addition, projecting regions 172 and/or recessed regions 174 may extend within, from, and/or proximate an outer edge 114 of a given rigid load-bearing structure 110. as illustrated in FIG. 1; however, this is not required.

As another example, rotation-limiting structures 170 may include, or be, a plurality of resilient members. An example of such resilient members includes a plurality of springs.

It is within the scope of the present disclosure that each rotation-limiting structure 170 that is associated with each adjacent pair of rigid load-bearing structures 110 may have, define, or restrict the adjacent pair of rigid load-bearing structures 110 to the same, or at least substantially the same, threshold adjacent pair angle of rotation. Alternatively, it is also within the scope of the present disclosure that a first rotation-limiting structure 170 may be configured to provide a first threshold angle of rotation that is different from a second threshold angle of rotation of a second rotation limiting structure 170. Stated another way, the plurality of rotation-limiting structures 170 may have and/or define a plurality of different threshold adjacent pair angles of rotation. As an example, the threshold adjacent pair angle of rotation may progressively, sequentially, and/or monotonically change from the first threshold adjacent pair angle of rotation, which may be associated with a first adjacent pair of rigid load-bearing structures 110 at first end 130 of layered stack 120, to second threshold adjacent pair angle of rotation, which may be associated with a second adjacent pair of rigid load-bearing structures 110 at second end 140 of layered stack 120.

It is within the scope of the present disclosure that the threshold adjacent pair angle of rotation, the first threshold adjacent pair angle of rotation, and/or the second threshold adjacent pair angle of rotation may have any suitable value. As examples, the threshold adjacent pair angle of rotation, the first threshold adjacent pair angle of rotation, and/or the second threshold adjacent pair angle of rotation may be at least 1 degree, at least 2 degrees, at least 3 degrees, at least 4 degrees, at least 5 degrees, and/or at least 6 degrees as measured about rotational axis 200. Additionally or alternatively, the threshold adjacent pair angle of rotation, the first threshold adjacent pair angle of rotation, and/or the second threshold adjacent pair angle of rotation may be at most 12 degrees, at most 11 degrees, at most 10 degrees, at most 9 degrees, at most 8 degrees, at most 7 degrees, at most 6 degrees, and/or at most 5 degrees as measured about rotational axis 200.

Similarly, the threshold stack angle of rotation may have any suitable value. As examples, the threshold stack angle of rotation may be at least 10 degrees, at least 20 degrees, at least 30 degrees, at least 40 degrees, at least 50 degrees, at least 60 degrees, at least 70 degrees, at least 80 degrees, at least 90 degrees, and/or at least 100 degrees as measured about rotational axis 200. Additionally or alternatively, the threshold stack angle of rotation may be at most 270 degrees, at most 240 degrees, at most 210 degrees, at most 180 degrees, at most 170 degrees, at most 160 degrees, at most 150 degrees, at most 140 degrees, at most 130 degrees, at most 120 degrees, at most 110 degrees, and/or at most 100 degrees as measured about rotational axis 200.

It is within the scope of the present disclosure that thrust bearing assembly 100 may include any suitable number of rotation-limiting structures 170. As examples, thrust bearing assembly 100 may include at least one, at least 2, at least 3, or at least 4 rotation-limiting structures 170 for each adjacent pair of rigid load-bearing structures 110.

Rigid load-bearing structures 110 may include any suitable material and/or materials. As examples, rigid load-bearing structures 110 may include and/or be formed from one or more of a metal, a steel, and an aluminum.

Figure 3:
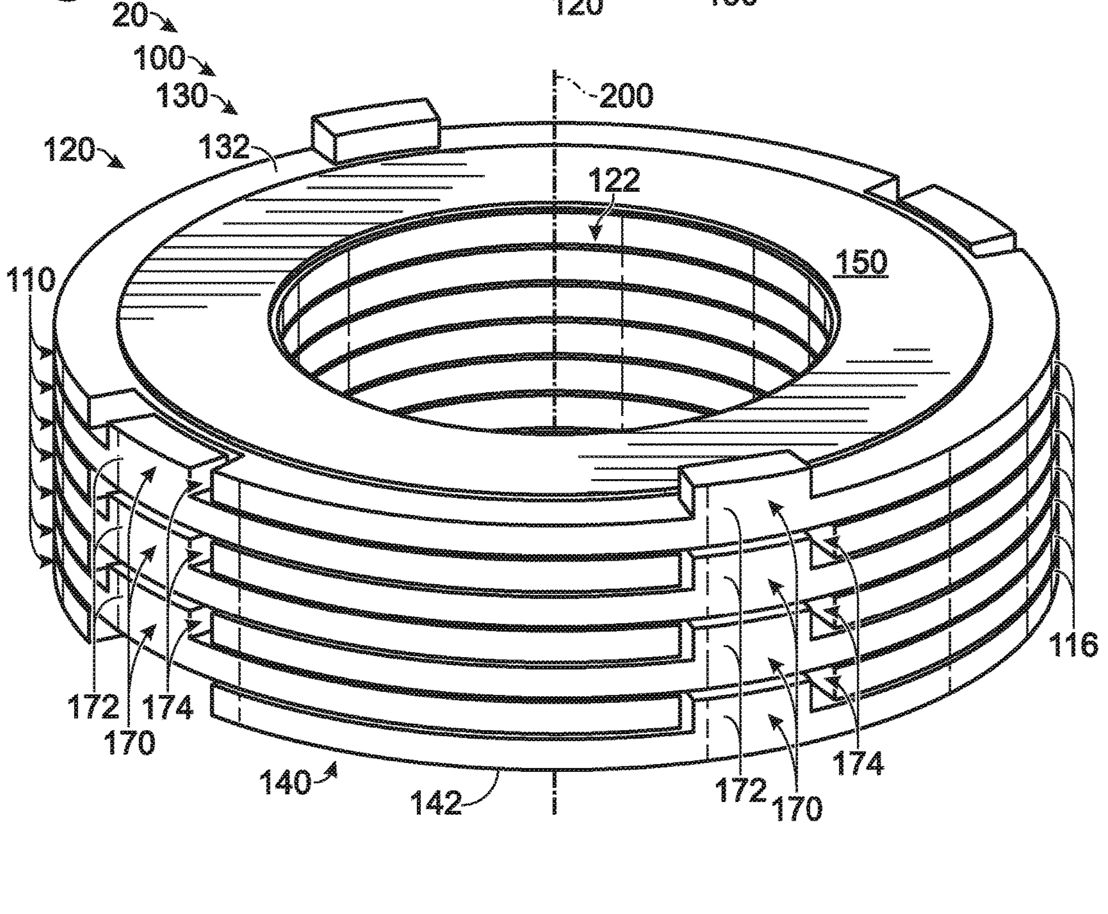
FIG. 3 is an assembled view of the thrust bearing assembly of FIG. 2.
Figure 2:
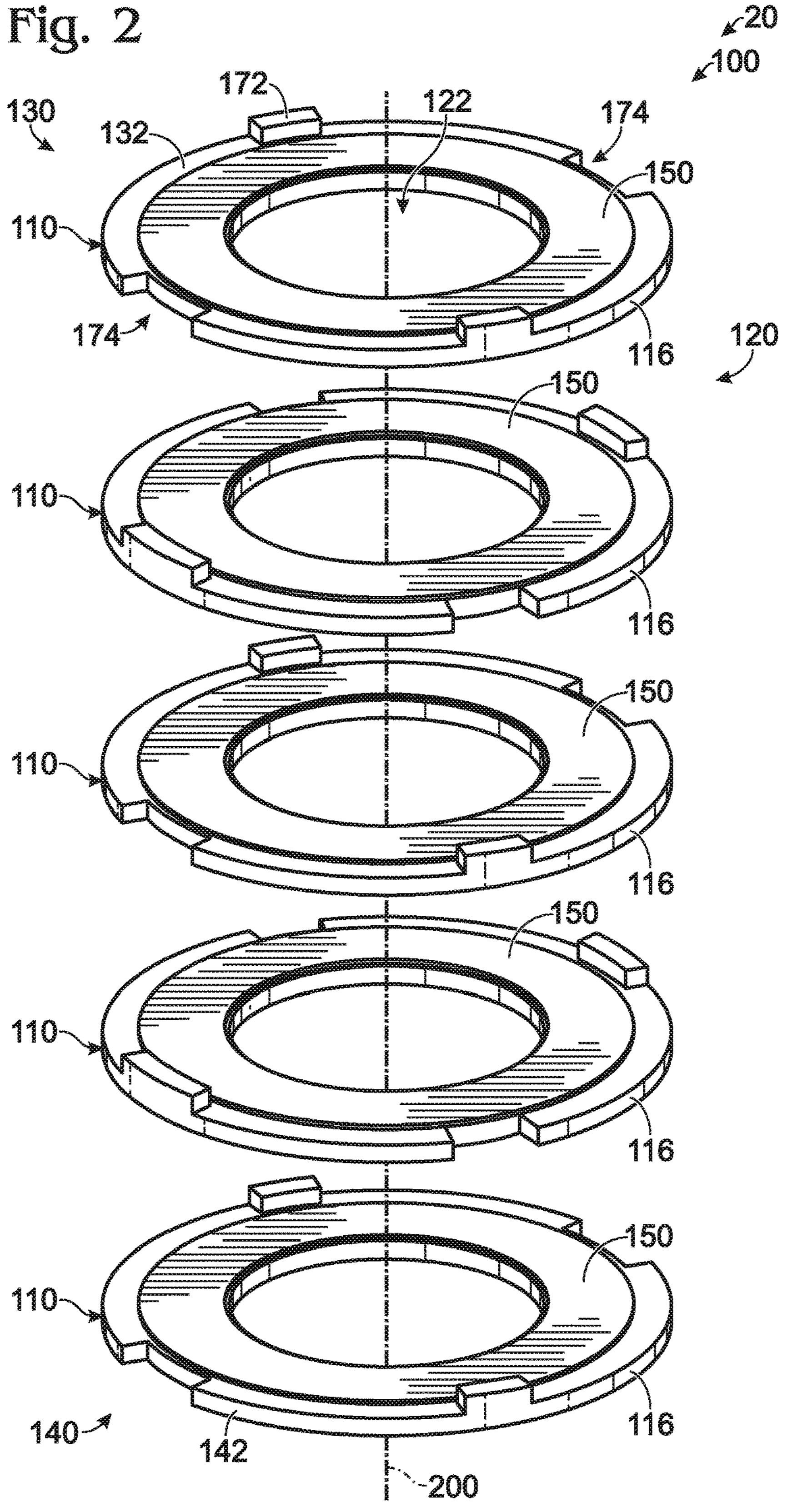
FIG. 2 is an exploded view of a thrust bearing assembly including a plurality of rigid load-bearing structures, according to the present disclosure.
Figure 4:
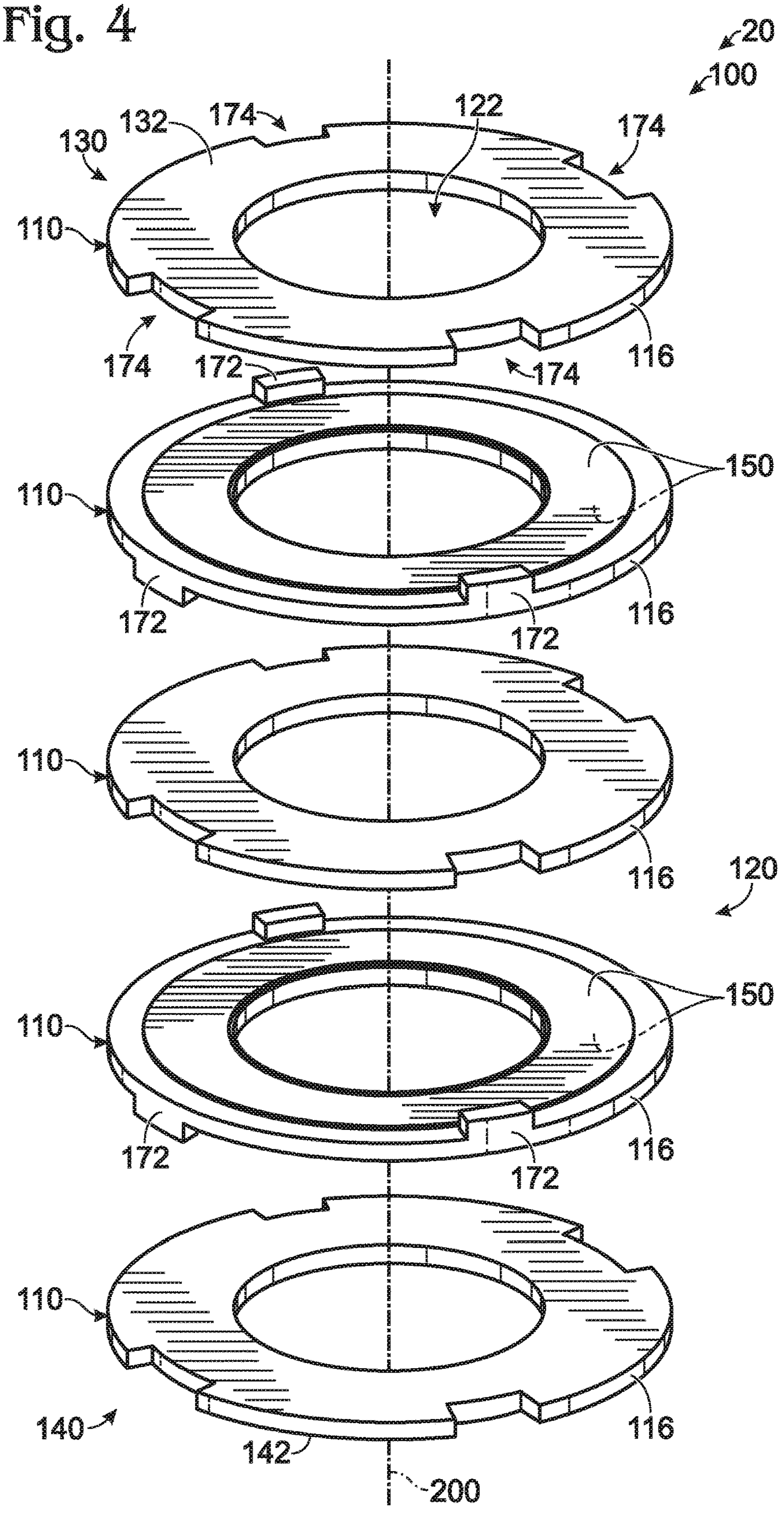
FIG. 4 is an exploded view of another thrust bearing assembly including a plurality of rigid load-bearing structures, according to the present disclosure.
Figure 5:
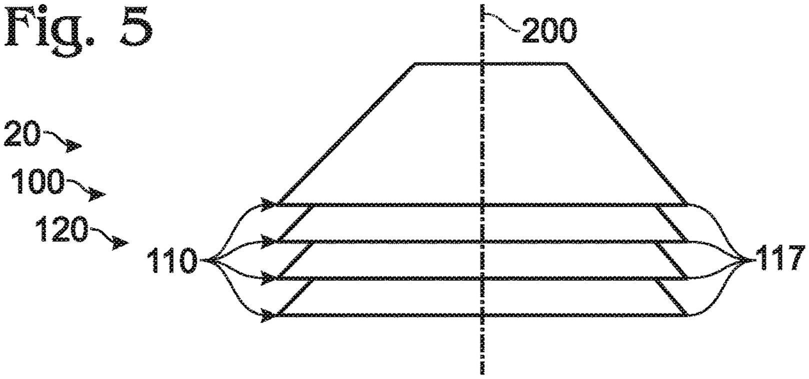
FIG. 5 is a schematic side view of another thrust bearing assembly according to the present disclosure.
Figure 6:
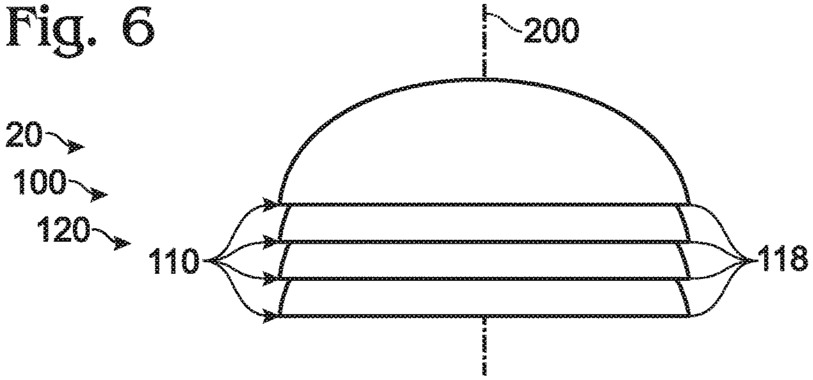
FIG. 6 is a schematic side view of another thrust bearing assembly according to the present disclosure.

In addition, rigid load-bearing structures 110 also may have and/or define any suitable shape. As an example, and as illustrated in FIGS. 2-4 and discussed in more detail herein, rigid load-bearing structures 110 may include a plurality of discs. As another example, and as illustrated in FIG. 5 and discussed in more detail herein, rigid load-bearing structures 110 may include a plurality of partial conic shells 117. As yet another example, and as illustrated in FIG. 6 and discussed in more detail herein, rigid load-bearing structures 110 may include a plurality of partial spherical shells 118.

As an additional example, and as illustrated in FIGS. 1-4, layered stack 120 of rigid load-bearing structures 110 may have and/or define a central bore 122. Central bore 122 may extend between first end 130 and second end 140, as discussed in more detail herein with reference to mechanical assembly 20 of FIG. 13.

It is within the scope of the present disclosure that each rigid load-bearing structure 110 may be similar, at least substantially similar, identical, or at least substantially identical to each other rigid load-bearing structure 110 in a given thrust bearing assembly 100. However, this is not required.

It is also within the scope of the present disclosure that layered stack 120 may include any suitable number of rigid load-bearing structures 110. As examples, the layered stack may include at least 3, at least 4, at least 6, at least 8, at least 10, at least 15, and/or at least 20 rigid load-bearing structures. Additionally or alternatively, the layered stack may include at most 50, at most 40, at most 30, at most 20, at most 15, and/or at most 10 rigid load-bearing structures.

As illustrated in dashed lines in FIG. 1, thrust bearing assembly 100 further may include an outer housing 190. Outer housing 190 may define, surround, and/or at least partially surround an enclosed volume 192. Layered stack 120 may extend within enclosed volume 192 and/or may be surrounded by outer housing 190. In addition, a fluid 194 also may extend and/or be present within enclosed volume 192. Fluid 194 may be selected and/or configured to lubricate and/or cool layered stack 120, such as to decrease friction and/or wear of rigid load-bearing structures 110 and/or of interface structures 150, when present, during relative rotation about rotational axis 200.

FIG. 2 is an exploded view of a thrust bearing assembly 100 including a plurality of rigid load-bearing structures 110, according to the present disclosure. FIG. 3 is an assembled view of the thrust bearing assembly of FIG. 2. Thrust bearing assembly 100 of FIGS. 2-3 includes a plurality of rigid load-bearing structures 110 and a plurality of interface structures 150, with a corresponding interface structure 150 being operatively attached to each rigid load-bearing structure 110. Rigid load-bearing structures 110 define a plurality of projecting regions 172 and a plurality of recessed regions 174 that together define a plurality of rotation-limiting structures 170, as perhaps best illustrated in FIG. 3.

FIG. 4 is an exploded view of another thrust bearing assembly 100 including a plurality of rigid load-bearing structures 110, according to the present disclosure. In FIG. 4, a subset of the plurality of rigid load-bearing structures 110 includes and/or defines a plurality of projecting regions 172, while another subset of the plurality of rigid load-bearing structures 110 includes and/or defines a plurality of recessed regions 174. Rigid load-bearing structures 110 that define projecting regions 172 are interleaved, staggered, and/or sequentially stacked with rigid load-bearing structures 110 that define recessed regions 174. Upon assembly of rigid load-bearing structures 110 of FIG. 4, each of the plurality of projecting regions 172 is received within a corresponding one of the plurality of recessed regions 174 to define a plurality of rotation-limiting structures that are similar to rotation-limiting structures 170 of FIGS. 2-3.

FIG. 4 also illustrates that a given rigid load-bearing structure 110 may have two interface structures 150 operatively attached thereto. Under these conditions, adjacent rigid load-bearing structures 110 may not have any interface structures 150 attached thereto, as discussed herein.

FIG. 5 is a schematic side view of another thrust bearing assembly 100 according to the present disclosure. Thrust bearing assembly 100 of FIG. 5 includes a plurality of rigid load-bearing structures 110 in the form of a plurality of partial conic shells 117. FIG. 6 is a schematic side view of another thrust bearing assembly 100 according to the present disclosure. Thrust bearing assembly 100 of FIG. 6 includes a plurality of rigid load-bearing structures 110 in the form of a plurality of partial spherical shells 118.

The configurations of FIGS. 5-6 may provide a certain amount of self-centering when partial conic shells 117 and/or partial spherical shells 118 are nested together. In addition, the configuration of FIGS. 5-6 also may provide a greater surface area for contact between rigid load-bearing structures 110 and/or between a given pair of rigid load-bearing structures 110 and an interface structure 150 that extends therebetween when compared to the more planar discs 116 of FIGS. 2-4.

Figure 7:
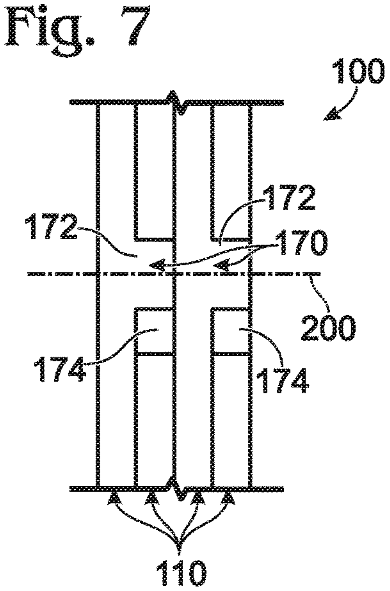
FIG. 7 is a less schematic side view of a portion of a thrust bearing assembly according to the present disclosure.
Figure 8:
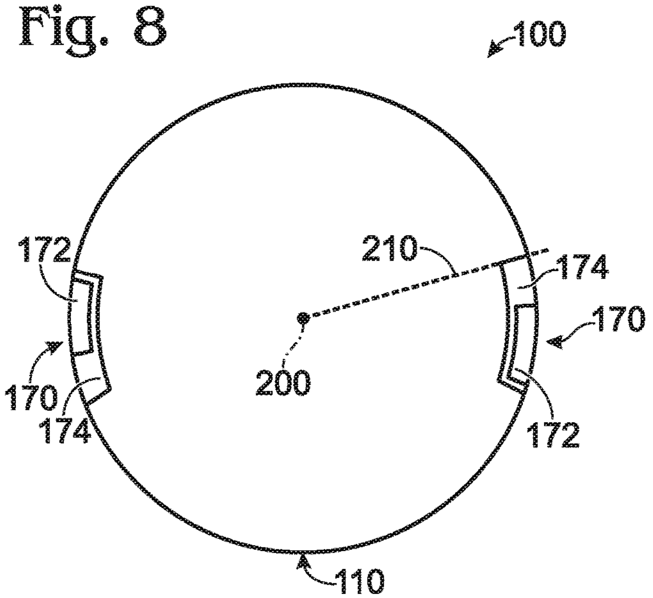
FIG. 8 is a less schematic top view of the thrust bearing assembly of FIG. 7.
Figure 9:
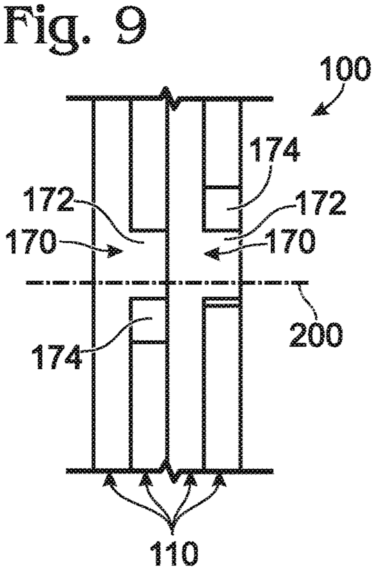
FIG. 9 is a less schematic side view of the thrust bearing assembly of FIGS. 7-8 illustrating rotation between adjacent pairs of rigid load-bearing structures.
Figure 10:
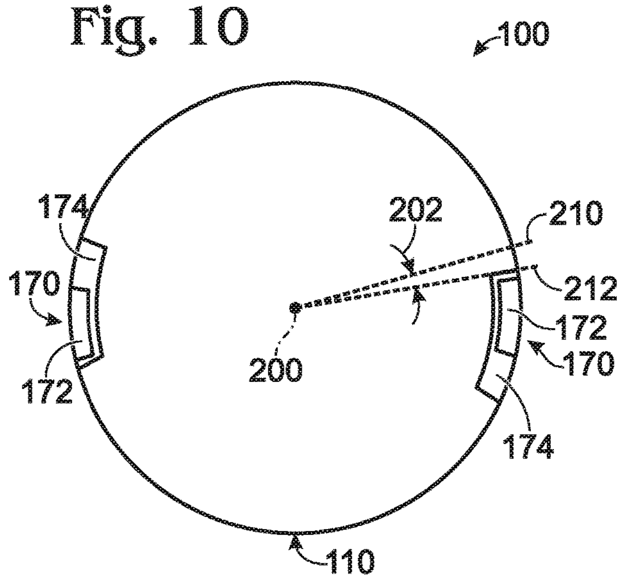
FIG. 10 is a less schematic top view of the thrust bearing assembly of FIG. 9.
Figure 11:
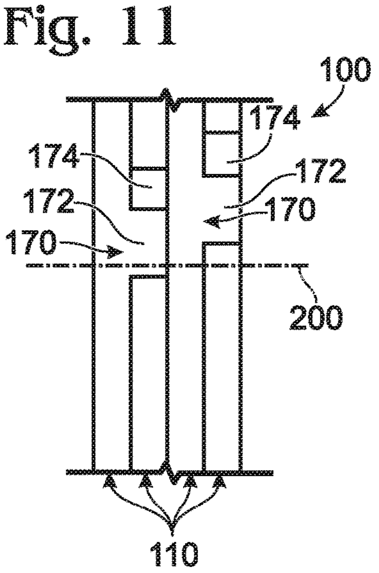
FIG. 11 is a less schematic side view of the thrust bearing assembly of FIGS. 7-10 illustrating layered stack rotation.
Figure 12:
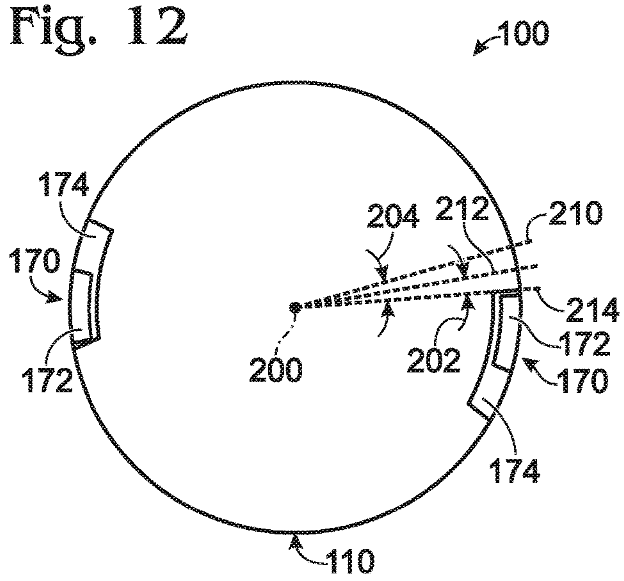
FIG. 12 is a less schematic top view of the thrust bearing assembly of FIG. 11.

FIGS. 7-12 illustrate how rotation of corresponding pairs of rigid load-bearing structures 110 about a rotational axis 200 is regulated, limited, and/or restricted by rotation-limiting structures 170. FIG. 7 is a less schematic side view of a portion of a thrust bearing assembly 100 according to the present disclosure, while FIG. 8 is a less schematic top view of thrust bearing assembly 100 of FIG. 7. FIG. 9 is a less schematic side view of thrust bearing assembly 100 of FIGS. 7-8 illustrating rotation between adjacent pairs of rigid load-bearing structures, while FIG. 10 is a less schematic top view of thrust bearing assembly 100 of FIG. 9. FIG. 11 is a less schematic side view of the thrust bearing assembly 100 of FIGS. 7-10 illustrating layered stack rotation, while FIG. 12 is a less schematic top view of thrust bearing assembly 100 of FIG. 11.

As illustrated in FIG. 7, rotation-limiting structures 170 of thrust bearing assembly 100 may define an initial orientation in which adjacent pairs of rigid load-bearing structures 110 are rotated with respect to one another to a counter-clockwise rotation when viewed from the side of FIG. 8. Under these conditions, an initial angular orientation for thrust bearing assembly 100 may be arbitrarily assigned and is indicated at 210.

Subsequently, a first adjacent pair of rigid load-bearing structures 110, such as the rightmost adjacent pair of rigid load-bearing structures 110 in FIG. 7, may be rotated relative to one another about rotational axis 200 until a projecting region 172 associated with a rotation-limiting structure 170 that restricts relative motion between the adjacent pair of rigid load-bearing structures reaches a threshold adjacent pair angle of rotation 202 (as illustrated in FIG. 10) that is defined for the rotation-limiting structure. This relative rotation causes a topmost rigid load-bearing structure 110, as illustrated in FIG. 10, to rotate from initial angular orientation 210 to a second angular orientation 212, and second angular orientation 212 differs from initial angular orientation 210 by threshold adjacent pair angle of rotation 202.

Additional rotation between the first adjacent pair of rigid load-bearing structures 110 about rotational axis 200 is restricted. However, and because thrust-bearing assembly 100 includes a plurality of adjacent pairs of rigid load-bearing structures 110 and a corresponding plurality of rotation-limiting structures 170, further rotation in the clockwise direction and about rotational axis 200 may be permitted.

This is illustrated in FIGS. 11-12. Therein, subsequent rotation about rotational axis 200 is accomplished by rotation of a second adjacent pair of rigid load-bearing structures 110, such as the leftmost adjacent pair of rigid load-bearing structures 110 in FIG. 9, relative to one another about rotational axis 200 until a projecting region 172 associated with a rotation-limiting structure 170 that restricts relative motion between the adjacent pair of rigid load-bearing structures reaches a corresponding threshold adjacent pair angle of rotation 202 (as illustrated in FIG. 12) that is defined for the rotation-limiting structure. This relative rotation permits the topmost rigid load-bearing structure 110 of FIG. 12 to rotate further to third angular orientation 214, which differs from second angular orientation 212 by threshold adjacent pair angle of rotation 202. Thus, a threshold stack angle of rotation 204 that may be provided by thrust bearing assembly 100 may be greater than the individual threshold adjacent pair angle of rotation 202 that may be experienced by individual adjacent pairs of rigid load-bearing structures 110.

Figure 13:
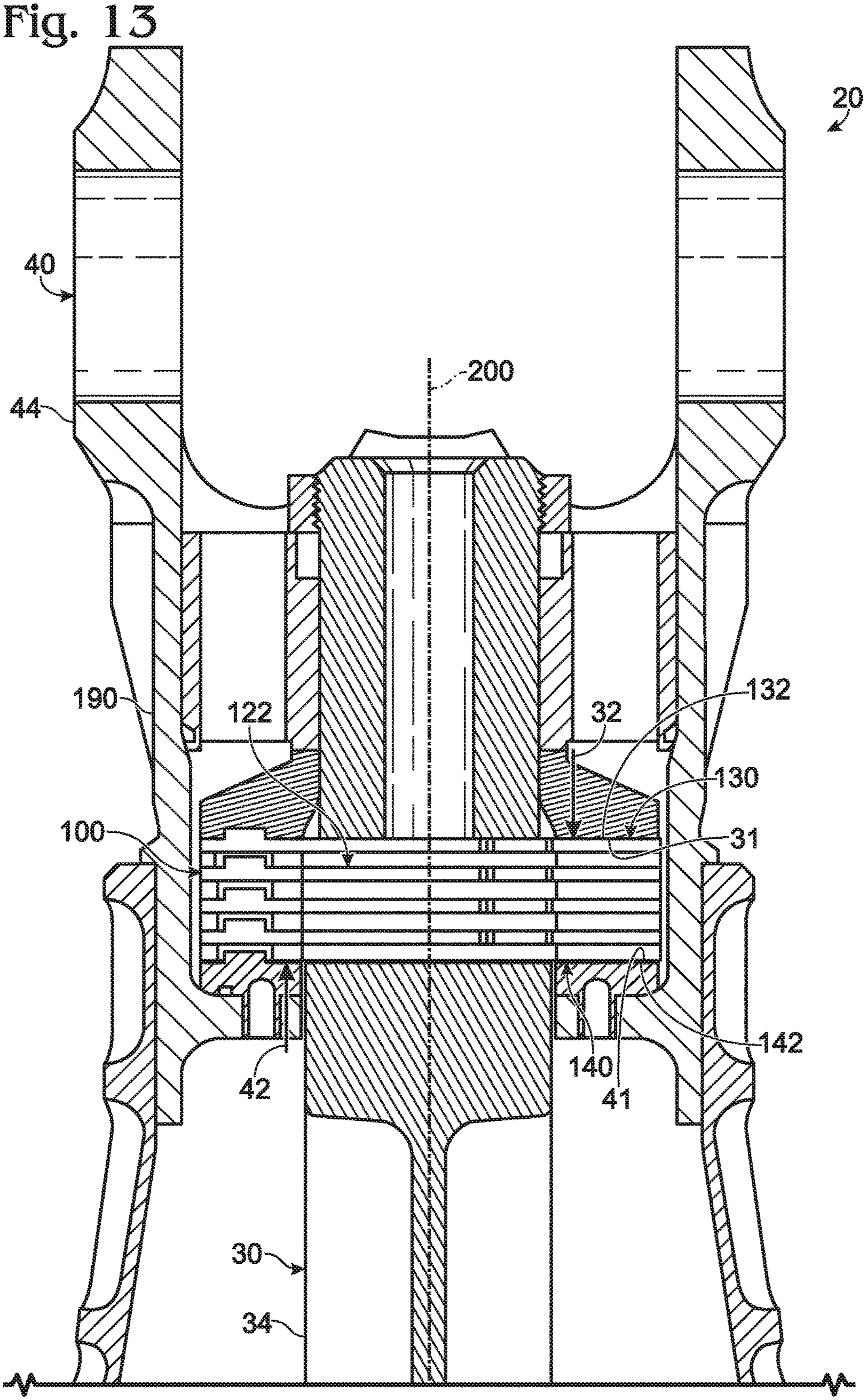
FIG. 13 is a less schematic view of a mechanical assembly according to the present disclosure.
Figure 14:
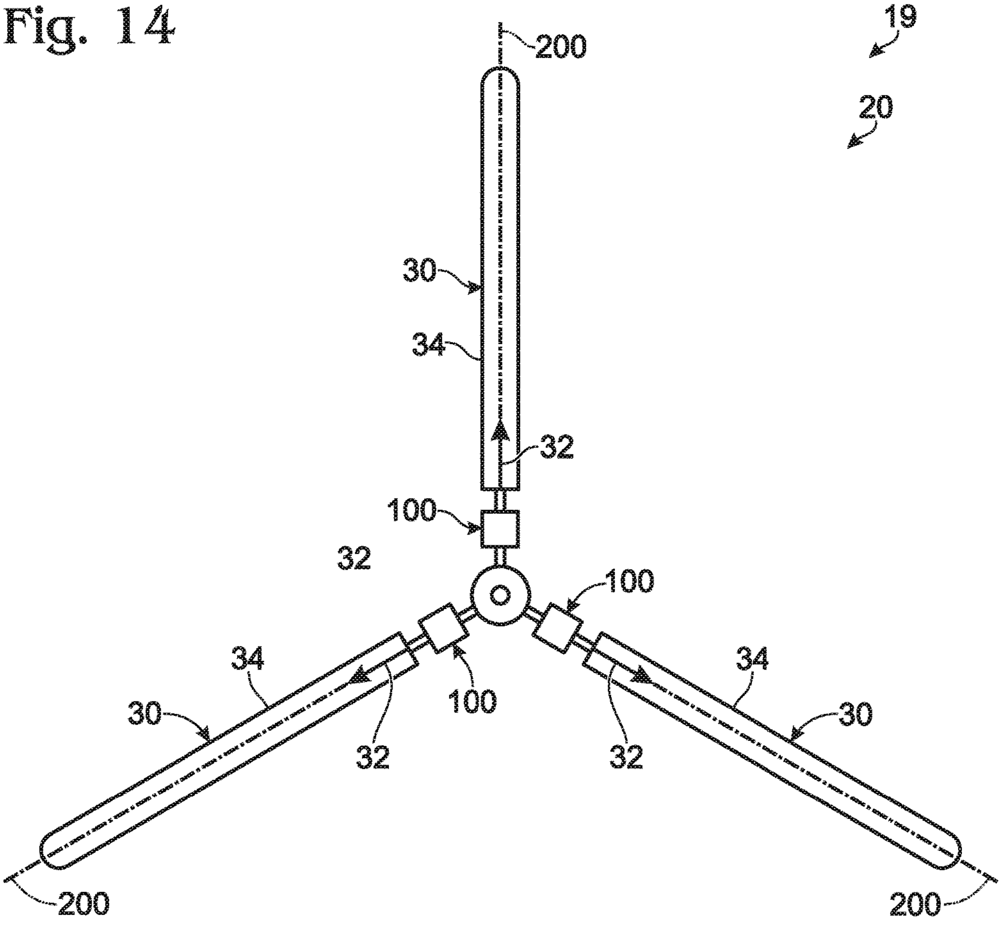
FIG. 14 is a schematic top view of a rotor assembly according to the present disclosure.

FIG. 13 is a less schematic view of a mechanical assembly 20 according to the present disclosure. Mechanical assembly 20 includes a first body 30, a second body 40, and a thrust bearing assembly 100. Thrust bearing assembly 100 of FIG. 13 may include any suitable structure, feature, and/or component of any of the thrust bearing assemblies 100 of any of FIGS. 1-12 without departing from the scope of the present disclosure. Similarly, any of the thrust bearing assemblies of any of FIGS. 1-12 may be included in and/or utilized with mechanical assembly 20 of FIG. 13 without departing from the scope of the present disclosure. Mechanical assembly 20 of FIG. 13 may include, or be, a rotor assembly 19, which is illustrated in FIG. 14. Under these conditions, first body 30 also may be referred to herein as a rotor blade 34, and second body 40 also may be referred to herein as a blade support flange 44. Rotor assembly 19 may form a portion of a helicopter 18, as illustrated in FIG. 15.

In the example of FIG. 13, mechanical assembly 20 includes an outer housing 190. Outer housing 190 at least partially surrounds thrust bearing assembly 100 and is operatively attached to and/or forms a portion of second body 40. Second body 40 further includes a second load-applying surface 41 that is configured to apply a second thrust load 42 to a second load-receiving surface 142 of a second end 140 of thrust bearing assembly 100. Thus, a center of mass of second body 40 may be referred to herein as being proximal a first end 130 of thrust bearing assembly 100 relative to second end 140. Stated another way, the center of mass of second body 40 may be closer to first end 130 than the center of mass of second body 40 is to second end 140. However, this is not required of all embodiments.

As discussed herein, thrust bearing assembly 100 may include a layered stack 120 of rigid load-bearing structures 110; and, layered stack 120 may define a central bore 122. Under these conditions, a portion of first body 30 may extend through central bore 122 and first body 30 may include a first load-applying surface 31 that may apply a first thrust load 32 to a first load-receiving surface 132 of thrust bearing assembly 100. Thus, a center of mass of first body 30 may be referred to herein as being proximal second end 140 of thrust bearing assembly 100 relative to first end 130. Stated another way, the center of mass of first body 30 may be closer to second end 140 than the center of mass of first body 30 is to first end 130.

As discussed herein, rotor assemblies conventionally utilize rubber bushings to permit relative rotation between a rotor blade and a blade support flange, and thrust bearing assemblies 100 according to the present disclosure may provide several benefits over the rubber bushings that conventionally are utilized in rotor assemblies. As an example, the limited rotation and/or velocity between adjacent pairs of rigid load-bearing structures may decrease friction, wear, and/or heat generation, or buildup, within thrust bearing assemblies 100 when compared to the conventional rubber bushings. This may extend the life of thrust bearing assemblies 100 when compared to the conventional rubber bushings.

As another example, conventional rubber bushings must be deformed to permit the rotation between the rotor blade and the blade support flange. As such, the conventional rubber bushings inherently generate a restoring force that urges the rotor blade toward a configuration in which the conventional rubber bushing is not deformed, and this restoring force must be overcome by an actuator that regulates the rotation between the rotor blade and the blade support flange. In contrast, thrust bearing assemblies 100 according to the present disclosure do not generate this restoring force upon rotation thereof and thus the actuator is not required to overcome the restoring force in order to rotate the rotor blade relative to the blade support flange.

As yet another example, the conventional rubber bushings permit only a limited amount of relative rotation between the rotor blade and the blade support flange. A length of the conventional rubber bushings may be increased to increase the amount of relative rotation while maintaining an torsional strain experienced by the conventional rubber bushings within design limits; however, the length needed for a desired level of relative rotation may be significant and/or may be more than is desirable for a given rotor assembly design. In contrast, thrust bearing assemblies 100 disclosed herein may permit a greater amount of relative rotation between the rotor blade and the blade support flange when compared to the conventional rubber bushings. In addition, this amount of relative rotation readily may be adjusted by adjusting a configuration of rotation-limiting structures 170 and/or by increasing a number of rigid load-bearing structures 110 within the thrust bearing assembly.

FIG. 16 is a flowchart depicting methods 300, according to the present disclosure, of providing limited rotational motion in a thrust bearing assembly. Methods 300 may be performed via and/or utilizing any suitable thrust bearing assembly, such as thrust bearing assemblies 100 of any of FIGS. 1-15.

Methods 300 include applying a first thrust load at 310, applying a second thrust load at 320, applying a torsional force at 330, and rotating to a first angle of rotation at 340. Methods 300 further may include resisting rotation past the first angle of rotation at 350 and/or resisting wear between first and second rigid load-bearing structures at 360. Methods 300 also include rotating to a second angle of rotation at 370 and may include resisting rotation past the second angle of rotation at 380 and/or resisting wear between second and third rigid load-bearing structures at 390.

Applying the first thrust load at 310 may include applying the first thrust load, such as first thrust load 32 of any of FIGS. 1 and/or 13, with a first body, such as first body 30 of any of FIGS. 1 and/or 13-14. Additionally or alternatively, the applying at 310 may include applying the first thrust load to a first load-receiving surface on a first end of the thrust bearing assembly, such as to first load-receiving surface 132 on first end 130 of any of FIGS. 1-4 and/or 13.

Applying the second thrust load at 320 may include applying the second thrust load, such as second thrust load 42 of any of FIGS. 1 and/or 13, with a second body, such as second body 40 of any of FIGS. 1 and/or 13-14. Additionally or alternatively, the applying at 310 may include applying the second thrust load to a second load-receiving surface on a second end of the thrust bearing assembly, such as to second load-receiving surface 142 on second end 140 of any of FIGS. 1-4 and/or 13. As illustrated therein, the first load-receiving surface may be opposed, or at least substantially opposed, to the second load-receiving surface. Additionally or alternatively, the first thrust load may be opposed, or at least substantially opposed, to the first thrust load.

Applying the torsional force at 330 may include applying the torsional force between the first body and the second body. This may include applying the torsional force in a rotational direction and/or about a rotational axis of the thrust bearing assembly, such as rotational axis 200 of any of FIGS. 1-14.

Rotating to the first angle of rotation at 340 may include rotating the first body and the second body relative to one another and to the first angle of rotation. This may include rotating via and/or utilizing relative rotation between a first rigid load-bearing structure of the thrust bearing assembly and a second rigid load-bearing structure of the thrust bearing assembly.

Resisting rotation past the first angle of rotation at 350 may include resisting relative rotation between the first rigid load-bearing structure and the second rigid load-bearing structure past the first angle of rotation, which also may be referred to herein as a threshold adjacent pair angle of rotation. The resisting at 350 may be accomplished via and/or utilizing a first rotation-limiting structure of the thrust bearing assembly. Examples of the first rotation-limiting structure are disclosed herein with reference to rotation-limiting structures 170 of any of FIGS. 1-4 and/or 7-12.

Resisting wear between the first and second rigid load-bearing structures at 360 may include resisting during the rotating at 340. This may include resisting via and/or utilizing a first interface structure that extends between the first rigid load-bearing structure and the second rigid load-bearing structure, that decreases a frictional force between the first rigid load-bearing structure and the second rigid load-bearing structure, and/or that resists direct physical contact between the first rigid load-bearing structure and the second rigid load-bearing structure. Examples of the first interface structure are disclosed herein with reference to interface structures 150 of any of FIGS. 1-4.

Rotating to the second angle of rotation at 370 may include rotating the first body and the second body relative to one another and to the second angle of rotation. This may include rotating via and/or utilizing relative rotation between the rigid load-bearing structure of the thrust bearing assembly and a third rigid load-bearing structure of the thrust bearing assembly, and the second angle of rotation may be greater than the first angle of rotation.

Resisting rotation past the second angle of rotation at 380 may include resisting relative rotation between the second rigid load-bearing structure and the third rigid load-bearing structure past the second angle of rotation. The second angle of rotation may be a sum of the threshold adjacent pair angle of rotation of the first and second rigid load-bearing structures and a threshold adjacent pair angle of rotation of the second and third rigid load-bearing structures and also may be referred to herein as a stack angle of rotation. The resisting at 380 may be accomplished via and/or utilizing a second rotation-limiting structure of the thrust bearing assembly. Examples of the second rotation-limiting structure are disclosed herein with reference to rotation-limiting structures 170 of any of FIGS. 1-4 and/or 7-12.

Resisting wear between the second and third rigid load-bearing structures at 390 may include resisting during the rotating at 370. This may include resisting via and/or utilizing a second interface structure that extends between the second rigid load-bearing structure and the third rigid load-bearing structure, that decreases a frictional force between the second rigid load-bearing structure and the third rigid load-bearing structure, and/or that resists direct physical contact between the second rigid load-bearing structure and the third rigid load-bearing structure. Examples of the second interface structure are disclosed herein with reference to interface structures 150 of any of FIGS. 1-4.

Illustrative, non-exclusive examples of inventive subject matter according to the present disclosure are described in the following enumerated paragraphs:

A1. A compact thrust bearing assembly configured to permit limited rotational motion of a first body relative to a second body about a rotational axis, the thrust bearing assembly comprising:

a plurality of rigid load-bearing structures arranged in a layered stack, wherein the layered stack defines a first end and an opposed second end;

a plurality of rotation-limiting structures, wherein a corresponding rotation-limiting structure of the plurality of rotation-limiting structures is configured to restrict relative rotation of each adjacent pair of rigid load-bearing structures of the plurality of rigid load-bearing structures to at most a threshold adjacent pair angle of rotation, and further wherein the plurality of rotation-limiting structures restricts overall relative rotation between the first end of the layered stack and the second end of the layered stack to at most a threshold stack angle of rotation that is greater than the threshold adjacent pair angle of rotation;

a first load-receiving surface on the first end of the layered stack, wherein the first load-receiving surface is configured to receive a first thrust load, which is directed toward the first load-receiving surface, from the first body; and a second load-receiving surface on the second end of the layered stack, wherein the second load-receiving surface is configured to receive a second thrust load, which is directed toward the second load-receiving surface, from the second body.

A2. The thrust bearing assembly of paragraph A1, wherein the thrust bearing assembly further includes a plurality of interface structures, wherein each interface structure of the plurality of interface structures extends, within the layered stack, in an interface region between a corresponding adjacent pair of rigid load-bearing structures of the plurality of rigid load-bearing structures to provide a low-friction and wear-resistant interface between the corresponding adjacent pair of rigid load-bearing structures during relative rotation of the corresponding adjacent pair of rigid load-bearing structures about the rotational axis.

A3. The thrust bearing assembly of paragraph A2, wherein each interface structure is configured to provide a low static friction interface between the corresponding adjacent pair of rigid load-bearing structures during the relative rotation of the corresponding adjacent pair of rigid load-bearing structures about the rotational axis.

A4. The thrust bearing assembly of any of paragraphs A2-A3, wherein each interface structure is configured to provide a low kinetic friction interface between the corresponding adjacent pair of rigid load-bearing structures during the relative rotation of the corresponding adjacent pair of rigid load-bearing structures about the rotational axis.

A5. The thrust bearing assembly of any of paragraphs A2-A4, wherein each interface structure is configured to maintain the corresponding adjacent pair of rigid load-bearing structures in a spaced-apart relationship.

A6. The thrust bearing assembly of any of paragraphs A2-A5, wherein each interface structure extends between the corresponding adjacent pair of rigid load-bearing structures.

A7. The thrust bearing assembly of any of paragraphs A2-A6, wherein the corresponding adjacent pair of rigid load-bearing structures includes a pair of interface surfaces, and further wherein each interface structure is configured to at least one of:

(i) maintain the pair of interface surfaces in a spaced-apart relationship;

(ii) prevent direct physical contact between the pair of interface surfaces; and (iii) lower a frictional force that resists rotation between the pair of interface surfaces during relative rotation of the pair of interface surfaces about the rotational axis.

A8. The thrust bearing assembly of any of paragraphs A2-A7, wherein each interface structure is operatively attached to one of the corresponding adjacent pair of rigid load-bearing structures, and further wherein each interface structure includes an interface structure surface that directly contacts the other of the corresponding adjacent pair of rigid load-bearing structures, optionally wherein the interface structure surface is at least one of a low-friction surface and a low-wear surface.

A9. The thrust bearing assembly of paragraph A8, wherein the other of the corresponding pair of rigid load-bearing structures includes a hardened surface, and further wherein the interface surface directly contacts the hardened surface, optionally wherein the hardened surface includes at least one of a hard chrome surface and an anodized aluminum surface.

A10. The thrust bearing assembly of any of paragraphs A2-A9, wherein the relative rotation of the corresponding adjacent pair of rigid load-bearing structures about the rotational axis is resisted by a frictional force between each interface structure and the corresponding adjacent pair of rigid load-bearing structures.

A11. The thrust bearing assembly of any of paragraphs A2-A10, wherein a number of interface structures in the plurality of interface structures corresponds to a number of rigid load-bearing structures in the plurality of rigid load-bearing structures.

A12. The thrust bearing assembly of any of paragraphs A2-A11, wherein a/the number of interface structures in the plurality of interface structures is one less than a/the number of rigid load-bearing structures in the plurality of rigid load-bearing structures.

A13. The thrust bearing assembly of any of paragraphs A2-A12, wherein each interface structure includes, and optionally is, at least one of a low-friction material and a low-friction fabric.

A14. The thrust bearing assembly of any of paragraphs A2-A13, wherein each interface structure includes, and optionally is, at least one of a polymer, a fluoropolymer, a fluorocarbon, and a tetrafluoroethylene.

A15. The thrust bearing assembly of any of paragraphs A2-A14, wherein each interface structure includes, and optionally is, a thin sheet of fluoropolymer fabric, optionally wherein the thin sheet of fluoropolymer fabric has a thickness of at least one of:

(i) at least 100 micrometers, at least 150 micrometers, at least 200 micrometers, or at least 250 micrometers; and (ii) at most 500 micrometers, at most 450 micrometers, at most 400 micrometers, at most 350 micrometers, or at most 300 micrometers.

A16. The thrust bearing assembly of any of paragraphs A2-A15, wherein each interface structure includes, and optionally is, a material that is configured to withstand a high contact pressure.

A17. The thrust bearing assembly of any of paragraphs A2-A16, wherein each interface structure includes, and optionally is, a material that is configured to be wear-resistant when subjected to sliding friction.

A18. The thrust bearing assembly of any of paragraphs A2-A17, wherein at least one frictional characteristic of at least one of the plurality of interface structures is different from the at least one frictional characteristic of at least one other of the plurality of interface structures such that the corresponding pair of rigid load-bearing structures that is associated with the at least one of the plurality of interface structures initiates relative rotational motion about the rotational axis prior to the corresponding pair of rigid load-bearing structures that is associated with the at least one other of the plurality of interface structures initiating relative rotational motion.

A19. The thrust bearing assembly of any of paragraphs A2-A18, wherein the thrust bearing assembly further includes an outer housing that defines an enclosed volume that contains the layered stack of rigid load-bearing structures.

A20. The thrust bearing assembly of paragraph A19, wherein the thrust bearing assembly further includes a fluid that extends within the enclosed volume and lubricates the layered stack of rigid load-bearing structures.

A21. The thrust bearing assembly of any of paragraphs A1-A20, wherein the plurality of rotation-limiting structures further is configured to resist relative motion among the plurality of rigid load-bearing structures in a direction that is perpendicular to the rotational axis.

A22. The thrust bearing assembly of any of paragraphs A1-A21, wherein each rigid load-bearing structure of the plurality of rigid load-bearing structures includes a projecting region, and optionally at least two projecting regions, that extends therefrom, wherein each rigid load-bearing structure further includes a recessed region, and optionally at least two recessed regions, that is defined therein, and further wherein, within each adjacent pair of rigid load-bearing structures, a given projecting region is received within a corresponding recessed region to define a corresponding rotation-limiting structure of the plurality of rotation-limiting structures.

A23. The thrust bearing assembly of any of paragraphs A1-A22, wherein a/the projecting region, and optionally at least two projecting regions, extends from at least a subset, and optionally each, of the plurality of rigid load-bearing structures, wherein a/the recessed region, and optionally at least two recessed regions, is defined within at least a subset, and optionally each, of the plurality of rigid load-bearing structures, and further wherein, the projecting region of a given rigid load-bearing structure of the plurality of rigid load-bearing structures extends into the recessed region of an adjacent rigid load-bearing structure of the plurality of rigid load-bearing structures to define a given rotation-limiting structure of the plurality of rotation-limiting structures.

A24. The thrust bearing assembly of any of paragraphs A22-A23, wherein each rigid load-bearing structure is a monolithic structure that defines both a respective projecting region and a respective recessed region.

A25. The thrust bearing assembly of any of paragraphs A22-A24, wherein the projecting region extends in a direction that is parallel, or at least substantially parallel, to the rotational axis.

A26. The thrust bearing assembly of any of paragraphs A22-A25, wherein the projecting region extends from an outer edge of each of the plurality of rigid load-bearing structures.

A27. The thrust bearing assembly of any of paragraphs A22-A26, wherein the recessed region is defined within an outer edge of each of the plurality of rigid load-bearing structures.

A28. The thrust bearing assembly of any of paragraphs A22-A27, wherein the recessed region is sized to permit limited motion of the projecting region therewithin.

A29. The thrust bearing assembly of any of paragraphs A1-A28, wherein the plurality of rotation-limiting structures includes a/the plurality of projecting regions and a/the plurality of recessed regions, which are defined by the plurality of rigid load-bearing structures, wherein the plurality of recessed regions is shaped to receive the plurality of projecting regions to restrict the relative rotation of each adjacent pair of rigid load-bearing structures to at most the threshold adjacent pair angle of rotation.

A30. The thrust bearing assembly of any of paragraphs A1-A29, wherein the plurality of rotation-limiting structures includes a plurality of resilient members, and optionally a plurality of springs.

A31. The thrust bearing assembly of any of paragraphs A1-A30, wherein a first rotation-limiting structure of the plurality of rotation-limiting structures is configured to provide a first threshold adjacent pair angle of rotation that is different from a second threshold adjacent pair angle of rotation of a second rotation-limiting structure of the plurality of rotation-limiting structures.

A32. The thrust bearing assembly of any of paragraphs A1-A31, wherein the plurality of rotation-limiting structures defines a plurality of different threshold adjacent pair angles of rotation.

A33. The thrust bearing assembly of any of paragraphs A1-A32, wherein the threshold adjacent pair angle of rotation of each of the plurality of rotation-limiting structures progressively changes from a/the first threshold adjacent pair angle of rotation, which is associated with a first adjacent pair of rigid load-bearing structures at the first end of the layered stack, to a/the second threshold adjacent pair angle of rotation, which is associated with a second adjacent pair of rigid load-bearing structures at the second end of the layered stack and which is different from the first threshold adjacent pair angle of rotation.

A34. The thrust bearing assembly of any of paragraphs A1-A33, wherein the threshold adjacent pair angle of rotation is at least one of:

(i) at least 1 degree, at least 2 degrees, at least 3 degrees, at least 4 degrees, at least 5 degrees, or at least 6 degrees as measured about the rotational axis; and (ii) at most 12 degrees, at most 11 degrees, at most 10 degrees, at most 9 degrees, at most 8 degrees, at most 7 degrees, at most 6 degrees, or at most 5 degrees as measured about the rotational axis.

A35. The thrust bearing assembly of any of paragraphs A1-A34, wherein the threshold stack angle of rotation is at least one of:

(i) at least 10 degrees, at least 20 degrees, at least 30 degrees, at least 40 degrees, at least 50 degrees, at least 60 degrees, at least 70 degrees, at least 80 degrees, at least 90 degrees, or at least 100 degrees as measured about the rotational axis; and (ii) at most 270 degrees, at most 240 degrees, at most 210 degrees, at most 180 degrees, at most 170 degrees, at most 160 degrees, at most 150 degrees, at most 140 degrees, at most 130 degrees, at most 120 degrees, at most 110 degrees, or at most 100 degrees as measured about the rotational axis.

A36. The thrust bearing assembly of any of paragraphs A1-A35, wherein the plurality of rigid load-bearing structures at least one of a metal, a steel, and an aluminum.

A37. The thrust bearing assembly of any of paragraphs A1-A36, wherein the plurality of load-bearing structures includes at least one of:

(i) a plurality of discs;

(ii) a plurality of partial conic shells; and (iii) a plurality of partial spherical shells.

A38. The thrust bearing assembly of any of paragraphs A1-A37, wherein each rigid load-bearing structure of the plurality of rigid load-bearing structures is similar, at least substantially similar, identical, or at least substantially identical to each other rigid load-bearing structure of the plurality of rigid load-bearing structures.

A39. The thrust bearing assembly of any of paragraphs A1-A38, wherein the plurality of rigid load-bearing structures includes at least one of:

(i) at least 3, at least 4, at least 6, at least 8, at least 10, at least 15, or at least 20 rigid load-bearing structures; and (ii) at most 50, at most 40, at most 30, at most 20, at most 15, or at most 10 rigid load-bearing structures.

B1. A compact thrust bearing assembly configured to permit limited rotational motion of a first body relative to a second body about a rotational axis, the thrust bearing assembly comprising:

a layered stack defined by a plurality of rigid load-bearing discs, wherein the layered stack defines a first end and an opposed second end;

a respective recessed region defined by each rigid load-bearing disc of the plurality of rigid load-bearing discs;

a respective projecting region defined by each rigid load-bearing disc, wherein the respective projecting region of a given rigid load-bearing disc of the plurality of rigid load-bearing discs projects into the respective recessed region of an adjacent rigid load-bearing disc of the plurality of rigid load-bearing discs to define a corresponding rotation-limiting structure;

a first load-receiving surface on the first end of the layered stack, wherein the first load-receiving surface is configured to receive a first thrust load from the first body; and a second load-receiving surface on the second end of the layered stack, wherein the second load-receiving surface is configured to receive a second thrust load from the second body.

B2. The thrust bearing assembly of paragraph B1, wherein the thrust bearing assembly includes a plurality of rotation-limiting structures, optionally wherein a corresponding rotation-limiting structure of the plurality of rotation-limiting structures is configured to restrict relative rotation of each adjacent pair of rigid load-bearing discs of the plurality of rigid load-bearing discs to at most a threshold adjacent pair angle of rotation, and further optionally wherein the plurality of rotation-limiting structures restricts overall relative rotation between the first end of the layered stack and the second end of the layered stack to at most a threshold stack angle of rotation that is greater than the threshold adjacent pair angle of rotation.

B3. The thrust bearing assembly of any of paragraphs B1-B2, wherein the thrust bearing assembly includes any suitable structure, component, and/or feature of any of the thrust bearing assemblies of any of paragraphs A1-A39.

C1. A mechanical assembly, comprising:

the thrust bearing assembly of any of paragraphs A1-B3;

the first body; and the second body.

C2. The mechanical assembly of paragraph C1, wherein the mechanical assembly further includes an/the outer housing that at least partially surrounds the thrust bearing assembly, wherein the outer housing is operatively attached to, or forms a portion of, the second body, and further wherein the outer housing includes a second load-applying surface configured to apply the second thrust load to the second load-receiving surface.

C3. The mechanical assembly of paragraph C2, wherein a center of mass of the second body is proximal the first end of the layered stack relative to the second end of the layered stack.

C4. The mechanical assembly of any of paragraphs C1-C3, wherein the layered stack defines a central bore that extends between the first end and the second end and along the rotational axis, wherein the first body extends through the central bore, and further wherein the first body includes a first load-applying surface configured to apply the first thrust load to the first load-receiving surface.

C5. The mechanical assembly of paragraph C4, wherein a center of mass of the first body is proximal the second end of the layered stack relative to the first end of the layered stack.

C6. The mechanical assembly of any of paragraphs C1-05, wherein the first body includes a rotor blade, wherein the second body includes a blade support flange of a rotor hub, and further wherein the mechanical assembly includes a rotor assembly for a helicopter.

C7. A helicopter including the mechanical assembly of any of paragraphs C1-C6.

C8. The mechanical assembly of paragraph C1, wherein the first thrust load is at least partially a result of a gravitational force acting on the first body, and further wherein the second thrust load is at least partially a result of a reaction force, from the second body, due to the first thrust force.

D1. A method of providing limited rotational motion in a compact thrust bearing assembly, the method comprising:

applying a first thrust load, with a first body, to a first load-receiving surface on a first end of the thrust bearing assembly;

applying a second thrust load, with a second body, to a second load-receiving surface of a second end of the thrust bearing assembly, optionally wherein the first load-receiving surface is opposed, or at least substantially opposed, to the second load-receiving surface, and further optionally wherein the first thrust load is opposed, or at least substantially opposed to the second thrust load;

applying a torsional force between the first body and the second body in a rotational direction and about an axis of rotation of the thrust bearing assembly;

rotating the first body and the second body relative to one another and to a first angle of rotation via relative rotation between a first rigid load-bearing structure of the thrust bearing assembly and a second rigid load-bearing structure of the thrust bearing assembly; and additionally rotating the first body and the second body relative to one another and to a second angle of rotation, which is greater than the first angle of rotation, via relative rotation between the second rigid load-bearing structure and a third rigid load-bearing structure of the thrust bearing assembly.

D2. The method of paragraph D1, wherein the method further includes resisting relative rotation between the first rigid load-bearing structure and the second rigid load-bearing structure past the first angle of rotation with a first rotation-limiting structure of the thrust bearing assembly.

D3. The method of any of paragraphs D1-D2, wherein the method further includes resisting relative rotation between the second rigid load-bearing structure and the third rigid load-bearing structure past the second angle of rotation with a second rotation-limiting structure of the thrust bearing assembly.

D4. The method of any of paragraphs D1-D3, wherein the method further includes resisting wear between the first rigid load-bearing structure and the second rigid load-bearing structure during the relative rotation therebetween with a first interface structure that extends between the first rigid load-bearing structure and the second rigid load-bearing structure.

D5. The method of any of paragraphs D1-D4, wherein the method further includes resisting wear between the second rigid load-bearing structure and the third rigid load-bearing structure during the relative rotation therebetween with a second interface structure that extends between the second rigid load-bearing structure and the third rigid load-bearing structure.

D6. The method of any of paragraphs D1-D5, wherein the thrust bearing assembly includes any suitable component, structure, and/or feature of any of the thrust bearing assemblies of any of paragraphs A1-63.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A rotor assembly for a helicopter, the rotor assembly comprising:

a compact thrust bearing assembly configured to permit limited rotational motion of a first body relative to a second body about a rotational axis, the thrust bearing assembly including:

(i) a plurality of rigid load-bearing structures arranged in a layered stack, wherein the layered stack defines a first end and an opposed second end;

(ii) a plurality of rotation-limiting structures, wherein a corresponding rotation-limiting structure of the plurality of rotation-limiting structures is configured to restrict relative rotation of each adjacent pair of rigid load-bearing structures of the plurality of rigid load-bearing structures to at most a threshold adjacent pair angle of rotation, and further wherein the plurality of rotation-limiting structures restricts overall relative rotation between the first end of the layered stack and the second end of the layered stack to at most a threshold stack angle of rotation that is greater than the threshold adjacent pair angle of rotation;

(iii) a first load-receiving surface on the first end of the layered stack, wherein the first load-receiving surface is configured to receive a first thrust load, which is directed toward the first load-receiving surface, from the first body; and (iv) a second load-receiving surface on the second end of the layered stack, wherein the second load-receiving surface is configured to receive a second thrust load, which is directed toward the second load-receiving surface, from the second body;

wherein the first body includes a rotor blade; and wherein the second body includes a blade support flange of a rotor hub.

2. The rotor assembly of claim 1, wherein the thrust bearing assembly further includes a plurality of interface structures, wherein each interface structure of the plurality of interface structures extends, within the layered stack, in an interface region between a corresponding adjacent pair of rigid load-bearing structures of the plurality of rigid load-bearing structures to provide a friction-reducing interface and a wear-resistant interface between the corresponding adjacent pair of rigid load-bearing structures during relative rotation of the corresponding adjacent pair of rigid load-bearing structures about the rotational axis.

3. The rotor assembly of claim 2, wherein each interface structure is configured to maintain the corresponding adjacent pair of rigid load-bearing structures in a spaced-apart relationship.

4. The rotor assembly of claim 2, wherein each interface structure is operatively attached to one of the corresponding adjacent pair of rigid load-bearing structures, and further wherein the interface structure includes an interface surface that directly contacts the other of the corresponding adjacent pair of rigid load-bearing structures.

5. The rotor assembly of claim 4, wherein the other of the corresponding pair of rigid load-bearing structures includes a hardened surface, and further wherein the interface surface directly contacts the hardened surface.

6. The rotor assembly of claim 2, wherein a number of interface structures in the plurality of interface structures is one less than a number of rigid load-bearing structures in the plurality of rigid load-bearing structures.

7. The rotor assembly of claim 2, wherein each interface structure includes at least one of a friction-reducing material, a friction-reducing fabric, a polymer, a fluoropolymer, a fluorocarbon, and a tetrafluoroethylene.

8. The rotor assembly of claim 2, wherein at least one frictional characteristic of at least one of the plurality of interface structures is different from the at least one frictional characteristic of at least one other of the plurality of interface structures such that, responsive to a torsional force applied about the rotational axis and between the first body and the second body, the corresponding pair of rigid load-bearing structures that is associated with the at least one of the plurality of interface structures transfers rotational motion about the rotational axis prior to the corresponding pair of rigid load-bearing structures that is associated with the at least one other of the plurality of interface structures transferring rotational motion.

9. The rotor assembly of claim 1, wherein the thrust bearing assembly further includes an outer housing that defines an enclosed volume that contains the layered stack of rigid load-bearing structures, and further wherein the thrust bearing assembly includes a fluid that extends within the enclosed volume and lubricates the layered stack of rigid load-bearing structures.

10. The rotor assembly of claim 1, wherein the plurality of rotation-limiting structures further is configured to resist relative motion among the plurality of rigid load-bearing structures in a direction that is perpendicular to the rotational axis.

11. The rotor assembly of claim 1, wherein each rigid load-bearing structure of the plurality of rigid load-bearing structures includes a projecting region that extends therefrom, wherein each rigid load-bearing structure further includes a recessed region that is defined therein, and further wherein, within each adjacent pair of rigid load-bearing structures, a given projecting region is received within a corresponding recessed region to define a corresponding rotation-limiting structure of the plurality of rotation-limiting structures.

12. The rotor assembly of claim 1, wherein the plurality of rotation-limiting structures includes a plurality of projecting regions and a plurality of recessed regions, which are defined by the plurality of rigid load-bearing structures, wherein the plurality of recessed regions is shaped to receive the plurality of projecting regions to restrict the relative rotation of each adjacent pair of rigid load-bearing structures to at most the threshold adjacent pair angle of rotation.

13. The rotor assembly of claim 1, wherein a first rotation-limiting structure of the plurality of rotation-limiting structures is configured to provide a first threshold adjacent pair angle of rotation that is different from a second threshold adjacent pair angle of rotation of a second rotation-limiting structure of the plurality of rotation-limiting structures.

14. The rotor assembly of claim 1, wherein:

(i) the threshold adjacent pair angle of rotation is at least 1 degree and at most 12 degrees; and (ii) the threshold stack angle of rotation is at least 40 degrees and at most 270 degrees.

15. A helicopter including the rotor assembly of claim 1.

16. A method of providing limited rotational motion in a compact thrust bearing assembly that forms a portion of a mechanical assembly that also includes a first body and a second body, the method comprising:

applying a first thrust load, with the first body, to a first load-receiving surface on a first end of the thrust bearing assembly;

applying a second thrust load, with the second body, to a second load-receiving surface of a second end of the thrust bearing assembly;

applying a torsional force between the first body and the second body in a rotational direction and about a rotational axis of the thrust bearing assembly;

rotating the first body and the second body relative to one another and to a first angle of rotation via relative rotation between a first rigid load-bearing structure of the thrust bearing assembly and a second rigid load-bearing structure of the thrust bearing assembly; and additionally rotating the first body and the second body relative to one another and to a second angle of rotation, which is greater than the first angle of rotation, via relative rotation between the second rigid load-bearing structure and a third rigid load-bearing structure of the thrust bearing assembly;

wherein:

(i) the mechanical assembly further includes an outer housing that at least partially surrounds the thrust bearing assembly;

(ii) the outer housing is operatively attached to the second body;

(iii) the outer housing includes a second load-applying surface configured to apply the second thrust load to the second load-receiving surface;

(iv) the first rigid load-bearing structure and the second rigid load-bearing structure together define a layered stack;

(v) the layered stack defines a central bore that extends between the first end and the second end and along the rotational axis;

(vi) the first body extends through the central bore; and (vii) the first body includes a first load-applying surface configured to apply the first thrust load to the first load-receiving surface.

17. A method of providing limited rotational motion in a compact thrust bearing assembly, the method comprising:

applying a first thrust load, with a rotor blade of a helicopter, to a first load-receiving surface on a first end of the thrust bearing assembly;

applying a second thrust load, with a blade support flange of a rotor hub of the helicopter, to a second load-receiving surface of a second end of the thrust bearing assembly;

applying a torsional force between the rotor blade and the blade support flange in a rotational direction and about a rotational axis of the thrust bearing assembly;

rotating the rotor blade and the blade support flange relative to one another and to a first angle of rotation via relative rotation, which produces sliding friction, between a first rigid load-bearing structure of the thrust bearing assembly and a second rigid load-bearing structure of the thrust bearing assembly; and additionally rotating the rotor blade and the blade support flange relative to one another and to a second angle of rotation, which is greater than the first angle of rotation, via relative rotation, which produces sliding friction, between the second rigid load-bearing structure and a third rigid load-bearing structure of the thrust bearing assembly.

18. A mechanical assembly, comprising:

a first body;

a second body; and a compact thrust bearing assembly configured to permit limited rotational motion of the first body relative to the second body about a rotational axis, the thrust bearing assembly including:

(i) a plurality of rigid load-bearing structures arranged in a layered stack, wherein the layered stack defines a first end and an opposed second end;

(ii) a plurality of rigid rotation-limiting structures, wherein a corresponding rigid rotation-limiting structure of the plurality of rigid rotation-limiting structures is configured to rigidly restrict relative rotation of each adjacent pair of rigid load-bearing structures of the plurality of rigid load-bearing structures to at most a threshold adjacent pair angle of rotation, and further wherein the plurality of rigid rotation-limiting structures rigidly restricts overall relative rotation between the first end of the layered stack and the second end of the layered stack to at most a threshold stack angle of rotation that is greater than the threshold adjacent pair angle of rotation;

(iii) a first load-receiving surface on the first end of the layered stack, wherein the first load-receiving surface is configured to receive a first thrust load, which is directed toward the first load-receiving surface, from the first body; and (iv) a second load-receiving surface on the second end of the layered stack, wherein the second load-receiving surface is configured to receive a second thrust load, which is directed toward the second load-receiving surface, from the second body;

wherein:

(i) the mechanical assembly further includes an outer housing that at least partially surrounds the thrust bearing assembly;

(ii) the outer housing is operatively attached to the second body;

(iii) the outer housing includes a second load-applying surface configured to apply the second thrust load to the second load-receiving surface;

(iv) the layered stack defines a central bore that extends between the first end and the second end and along the rotational axis;

(v) the first body extends through the central bore; and (vi) the first body includes a first load-applying surface configured to apply the first thrust load to the first load-receiving surface.

19. A compact thrust bearing assembly configured to permit limited rotational motion of a first body relative to a second body about a rotational axis, the thrust bearing assembly comprising:

a plurality of rigid load-bearing structures arranged in a layered stack, wherein the layered stack defines a first end and an opposed second end;

a plurality of rigid rotation-limiting structures, wherein a corresponding rigid rotation-limiting structure of the plurality of rigid rotation-limiting structures is configured to rigidly restrict relative rotation of each adjacent pair of rigid load-bearing structures of the plurality of rigid load-bearing structures to at most a threshold adjacent pair angle of rotation, and further wherein the plurality of rigid rotation-limiting structures rigidly restricts overall relative rotation between the first end of the layered stack and the second end of the layered stack to at most a threshold stack angle of rotation that is greater than the threshold adjacent pair angle of rotation;

a first load-receiving surface on the first end of the layered stack, wherein the first load-receiving surface is configured to receive a first thrust load, which is directed toward the first load-receiving surface, from the first body; and a second load-receiving surface on the second end of the layered stack, wherein the second load-receiving surface is configured to receive a second thrust load, which is directed toward the second load-receiving surface, from the second body; and a plurality of interface structures, wherein each interface structure of the plurality of interface structures extends, within the layered stack, in an interface region between a corresponding adjacent pair of rigid load-bearing structures of the plurality of rigid load-bearing structures to provide a friction-reducing interface and a wear-resistant interface between the corresponding adjacent pair of rigid load-bearing structures during relative rotation of the corresponding adjacent pair of rigid load-bearing structures about the rotational axis, and further wherein a number of interface structures in the plurality of interface structures is one less than a number of rigid load-bearing structures in the plurality of rigid load-bearing structures.

20. A compact thrust bearing assembly configured to permit limited rotational motion of a first body relative to a second body about a rotational axis, the thrust bearing assembly comprising:

a plurality of rigid load-bearing structures arranged in a layered stack, wherein the layered stack defines a first end and an opposed second end;

a plurality of rotation-limiting structures, wherein a corresponding rotation-limiting structure of the plurality of rotation-limiting structures is configured to restrict relative rotation of each adjacent pair of rigid load-bearing structures of the plurality of rigid load-bearing structures to at most a threshold adjacent pair angle of rotation, and further wherein the plurality of rotation-limiting structures restricts overall relative rotation between the first end of the layered stack and the second end of the layered stack to at most a threshold stack angle of rotation that is greater than the threshold adjacent pair angle of rotation;

a first load-receiving surface on the first end of the layered stack, wherein the first load-receiving surface is configured to receive a first thrust load, which is directed toward the first load-receiving surface, from the first body;

a second load-receiving surface on the second end of the layered stack, wherein the second load-receiving surface is configured to receive a second thrust load, which is directed toward the second load-receiving surface, from the second body; and a plurality of interface structures, wherein each interface structure of the plurality of interface structures extends, within the layered stack, in an interface region between a corresponding adjacent pair of rigid load-bearing structures of the plurality of rigid load-bearing structures to provide a friction-reducing interface and a wear-resistant interface between the corresponding adjacent pair of rigid load-bearing structures during relative rotation of the corresponding adjacent pair of rigid load-bearing structures about the rotational axis, and further wherein at least one frictional characteristic of at least one interface structure of the plurality of interface structures is different from the at least one frictional characteristic of at least one other interface structure of the plurality of interface structures such that, responsive to a torsional force applied about the rotational axis and between the first body and the second body, the corresponding adjacent pair of rigid load-bearing structures that is associated with the at least one interface structure of the plurality of interface structures transfers rotational motion about the rotational axis prior to the corresponding adjacent pair of rigid load-bearing structures that is associated with the at least one other interface structure of the plurality of interface structures transferring rotational motion.

* * * * *